Oct. 29, 1929.  B. F. SHILLER  1,733,914
ATTACHMENT FOR PLOW BEAMS
Filed July 16, 1928   3 Sheets-Sheet 1

B. F. Shiller, INVENTOR
BY Victor J. Evans
ATTORNEY

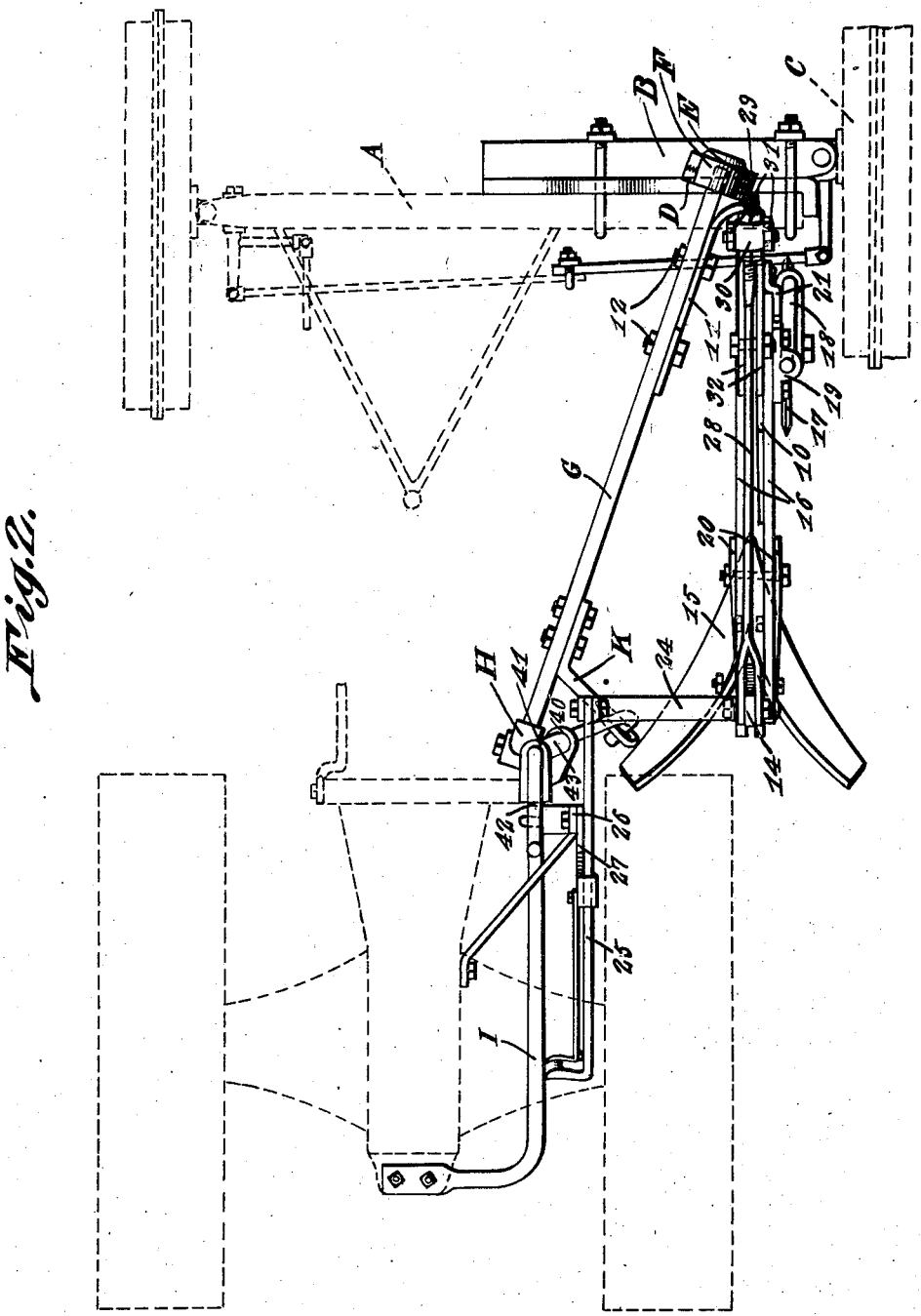

Oct. 29, 1929.  B. F. SHILLER  1,733,914
ATTACHMENT FOR PLOW BEAMS
Filed July 16, 1928   3 Sheets-Sheet 3
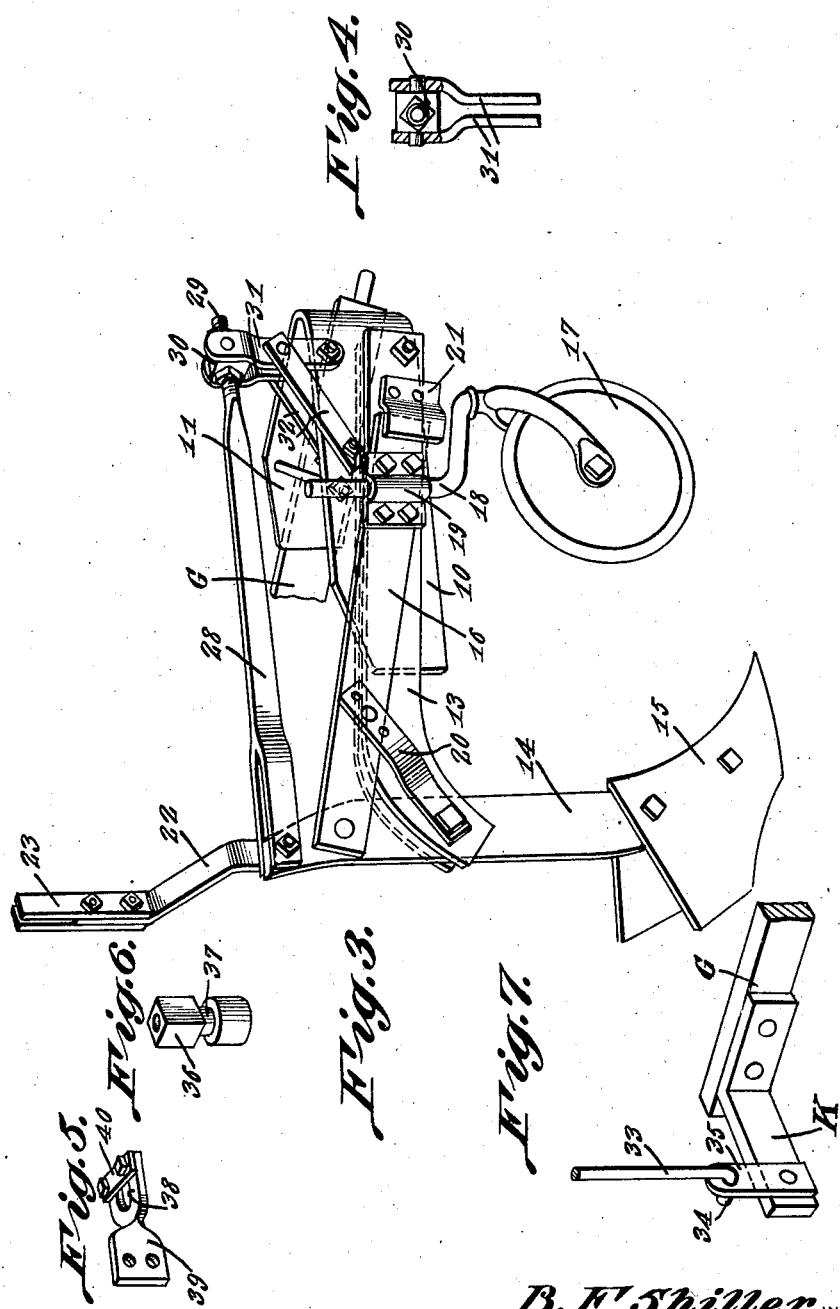

Patented Oct. 29, 1929

1,733,914

UNITED STATES PATENT OFFICE

BEDRICH F. SHILLER, OF VICTORIA, TEXAS

ATTACHMENT FOR PLOW BEAMS

Application filed July 16, 1928. Serial No. 293,291.

This invention relates to tractor plows, and contemplates a single row middle buster attachment capable of being quickly and conveniently associated with the usual plow beam supported diagonally on the tractor.

In carrying out the invention I contemplate an attachment of the above mentioned character capable of being conveniently raised or lowered with relation to the ground and also tilted together with the plow beam with a view of properly leveling the attachment.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 2 is a top plan view.

Figure 3 is a perspective view of the attachment showing the usual plow beam.

Figure 4 is a sectional view showing the manner of supporting one end of the adjustable rod which is connected with the standard.

Figure 5 is a detail view of the bracket forming part of the leveling device.

Figure 6 is a detail view of the nut for the leveling device.

Figure 7 is a fragmentary view showing how the adjustable device is connected with the plow beam.

Figure 1:
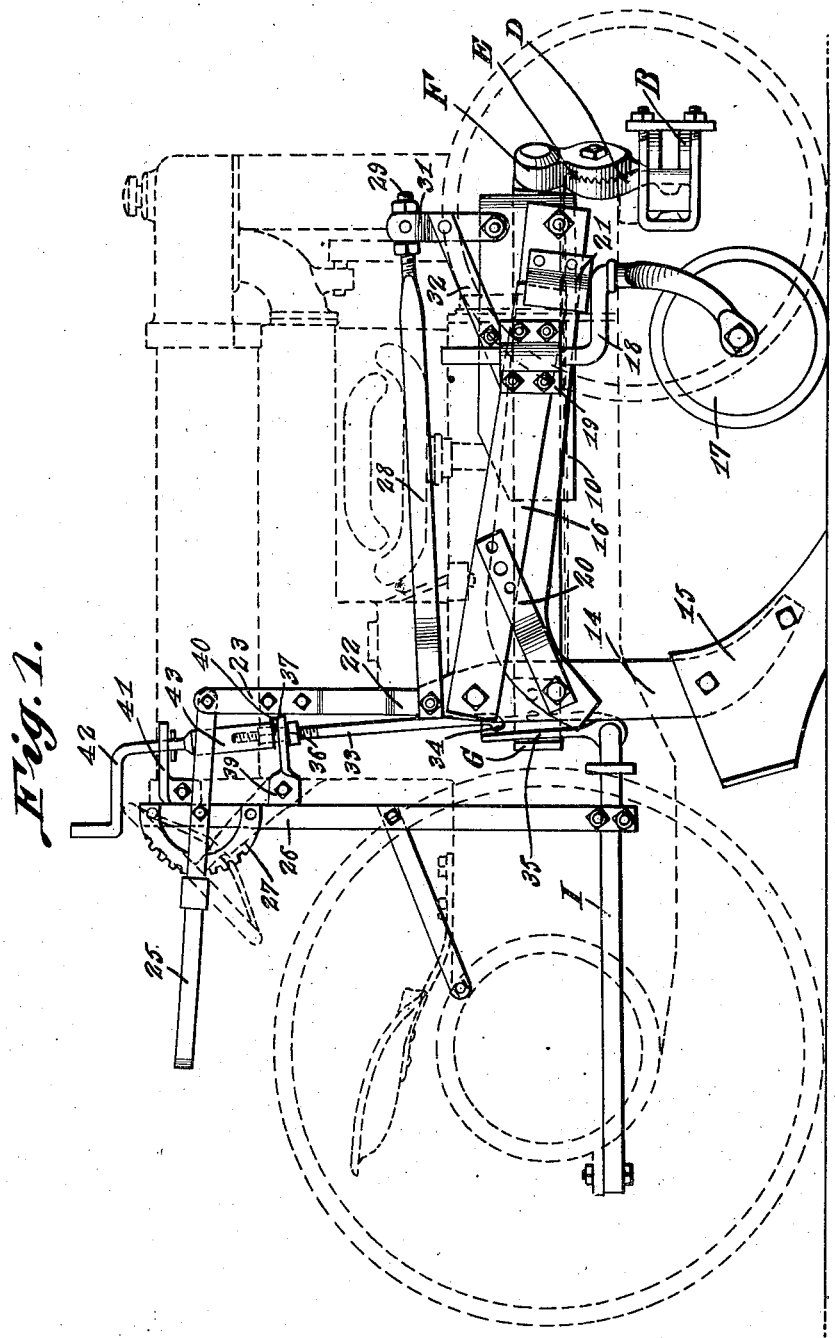
Figure 1 is a side elevation of a tractor showing the invention mounted thereon.

Referring to the drawings in detail A indicates the front axle of a tractor of ordinary well known construction which is provided with an extension B upon which the adjacent front wheel C is mounted, so that the front wheel can be disposed entirely to one side and out of align with the rear wheel to straddle the row as will be readily understood. Carried by this extension B is a lug D formed with teeth which cooperate with similar teeth on a lug E, the latter being formed with a bearing F for the adjacent end of the plow beam G. The lugs D and E prevent casual turning or derangement of the beam G. The rear end of this beam is also journaled in a suitable bearing H which forms part of a supporting means including a rod I which is extended along the side of the tractor and suitably secured to the end thereof as clearly illustrated in Figure 2. The beam G is equipped with a bracket K which usually supports a disk plow, but which is utilized in the present invention as a means for associating the beam with the leveling mechanism. The various parts hereinabove described are well known in the art and do not constitute a part of the present invention, the latter relating to an attachment designed to be attached to the beam G.

The attachment embodies a main plate 10 which is disposed edgewise and has one end curved and extended obliquely as at 11, so that this plate can be conveniently attached to the beam G by suitable fastening elements 12. Pivoted upon the opposite sides of the plate 10 are braces 13 which straddle the standard 14 of the plow element 15 as clearly illustrated in Figures 2 and 3. Arranged upon one of the braces 13 is the colter beam 16 arranged diagonally and having its rear end connected to the standard 14. The colter 17 is journaled in the forked extremity of a shank 18 journalled in a suitable bracket 19 fixed to the beam 16. The beam 16 is also steadied and strengthened by a brace 20, while the forward extremity of the beam is arranged within a bracket 21.

For the purpose of raising and lowering the plow element 15 with relation to the ground, I provide the standard 14 with a vertical extension preferably made up in sections 22 and 23 respectively which are suitably secured together, the extension rising from the horizontally disposed arm 24 attached to the standard in any suitable manner. Pivoted upon the extension is a lever 25 which is also pivoted on a suitable standard 26 forming part of the beam supporting structure. This lever 25 is disposed in convenient reach of the driver, and can be conveniently operated to raise or lower the plow element as will be readily understood. The lever 25 is equipped with a suitable pawl which cooperates with a toothed rack or segment 27 for holding the plow element in a given adjusted position.

The standard 14 can be tilted forwardly and rearwardly to properly position the plow element with relation to the ground by means of the adjustable bar 28 which is arranged above and parallel with the braces 13. One end of this bar 28 is forked to straddle the standard 14 to which it is secured, while the forward end of the bar is rounded and threaded as at 29 to accommodate itself to a suitable nut 30 associated with a knuckle supported between a pair of bracket plates 31 which rises from the main plate 10 as illustrated in Figure 3. The bracket plates are held in parallel position by braces 32 connected therewith and also with the main plate 10.

As above stated and clearly illustrated in the drawings the attachment is carried by the usual beam G which is mounted for partial rotation in the bearings F and H respectively. In order to level the plow element and colter I provide a novel construction of means for adjusting the beam G. This means consists of a vertically disposed adjustable rod 33, the lower end of which is offset as at 34 and received by an apertured plate 35 carried by the bracket K forming part of the beam G. The rod 33 has its upper end threaded through a nut 36 which is formed with an intermediate groove 37 which accommodates the forked portion 38 of a bracket, the body portion 39 of which is arranged at a right angle to the forked portion 38 and secured to the standard 27. Supported by the forked portion 38 is a strap 40 which holds the nut operatively associated with the bracket. Carried by the standard 27 above the bracket 39 is another bracket 41 which supports a crank handle 42, the lower end of which is provided with a socket 43 to receive the upper end of the rod 33 and to also accommodate itself to the nut 37. The crank handle 42 is arranged within convenient reach of the operator, and when turned in one or the other direction will either raise or lower the rod 33 and thereby tilt the beam G in the proper direction with a view of leveling the attachment. It is manifest that the invention is designed to be conveniently mounted on the usual plow beam G of a tractor plow and conveniently manipulated from the driver's seat with the parts arranged so that the operator can see the work as it is performed by the attachment.

While it is believed that from the foregoing description the nature and advantages of the invention will be readily understood, I desire to have it known that I do not limit myself to what is herein shown and described and that such changes may be resorted to when desired as fall within the scope of what is claimed.

What is claimed is:

1. A tractor plow attachment comprising in combination with a diagonally supported beam capable of being tilted, a main plate carried by said beam and spaced therefrom, a standard, a plow element on the lower end of the standard, a colter disposed in advance of said element, braces pivotally supporting said standard from the main plate for adjustment toward and away from the ground, and means for tilting said beam to level said attachment.

2. A tractor plow attachment comprising in combination with a diagonally supported beam capable of being tilted, a main plate carried by said beam and spaced therefrom, a standard, a plow element on the lower end of the standard, braces pivotally supported on the main plate and pivotally supporting said standard, means for adjusting said standard toward and away from the ground, a colter beam supported by the standard and one of said braces, a colter carried by the last mentioned beam, means for tilting said standard forwardly and rearwardly to properly position the plow element with relation to the ground, and means for tilting the first mentioned beam to level said attachment.

3. A tractor plow attachment comprising in combination with a diagonally supported beam capable of being tilted, a main plate carried by the beam and spaced therefrom, a standard pivotally supported from the plate, a plow element carried by the standard, means for adjusting said standard vertically, means for tilting said standard forwardly and rearwardly to properly position the plow element with relation to the ground, said means comprising an adjustable rod supported by the standard and said main plate, and means for tilting said beam for leveling said attachment.

4. A tractor attachment comprising in combination with a diagonally supported beam capable of being tilted, a main plate carried by the beam and spaced therefrom, a standard pivotally supported on the main plate, a colter supported by the standard and arranged in advance thereof, a plow element carried by the lower end of the standard, means for tilting said beam for leveling said attachment, said means comprising a vertically disposed rod having its lower end connected with the beam, a bracket, a nut supported on said bracket and threadedly associated with the upper end of said rod, and a handle supported for rotation and associated with said nut whereby the latter can be turned to effect an adjustment of said rod for the purpose specified.

In testimony whereof I affix my signature.

BEDRICH F. SHILLER.